(12) United States Patent
Deane

(10) Patent No.: US 12,089,544 B2
(45) Date of Patent: Sep. 17, 2024

(54) HYPERPONIC GROWING APPARATUS

(71) Applicant: Jared Deane, Rochester Hills, MI (US)

(72) Inventor: Jared Deane, Rochester Hills, MI (US)

( * ) Notice: Subject to any disclaimer, the term of this patent is extended or adjusted under 35 U.S.C. 154(b) by 153 days.

(21) Appl. No.: 18/090,610

(22) Filed: Dec. 29, 2022

(65) Prior Publication Data

US 2024/0215504 A1      Jul. 4, 2024

(51) Int. Cl.
| | |
|---|---|
| *A01G 9/16* | (2006.01) |
| *A01G 9/18* | (2006.01) |
| *A01G 9/24* | (2006.01) |
| *A01G 31/02* | (2006.01) |

(52) U.S. Cl.
CPC .............. *A01G 31/02* (2013.01); *A01G 9/16* (2013.01); *A01G 9/18* (2013.01); *A01G 9/24* (2013.01)

(58) Field of Classification Search
CPC . A01G 9/14; A01G 9/176; A01G 9/16; A01G 9/18; A01G 9/24; A01G 9/246; A01G 9/249; A01G 2009/248
See application file for complete search history.

(56) References Cited

U.S. PATENT DOCUMENTS

| | | | |
|---|---|---|---|
| 4,543,744 A * | 10/1985 | Royster | A01G 9/00 47/60 |
| 4,850,135 A | 7/1989 | DeMarco | |
| 5,341,595 A | 8/1994 | Griggs | |
| 7,143,544 B2 | 12/2006 | Roy | |
| 8,468,741 B2 | 6/2013 | Lewis | |
| 10,694,680 B2 | 6/2020 | Krijn | |
| 2005/0005529 A1* | 1/2005 | Brault | A01G 9/24 52/63 |
| 2022/0030777 A1* | 2/2022 | Takagi | A01G 7/045 |
| 2024/0147918 A1* | 5/2024 | Cully | A01G 9/246 |

FOREIGN PATENT DOCUMENTS

WO    WO2011119769      9/2011

* cited by examiner

*Primary Examiner* — Christopher D Hutchens
*Assistant Examiner* — Edgar Reyes

(57) ABSTRACT

A hyperponic growing apparatus includes a growing chamber for supporting the growth of a plant positioned within the growing chamber. A cooling duct is attached to the growing chamber and the cooling duct is comprised of a translucent material to pass light through the cooling duct. The cooling duct is fluidly coupled to an air conditioning unit to facilitate moisture within the growing chamber to condense on the cooling duct. A growing light is suspended from the growing chamber to emit light through the cooling duct to facilitate the plant to be exposed to the light emitted by the growing light. An irrigation unit is in fluid communication with the cooling duct to collect the condensed moisture from the cooling duct. Furthermore, the irrigation unit has an outlet integrated into a pot in which the plant is growing to direct the condensed moisture into the pot for irrigating the plant.

18 Claims, 7 Drawing Sheets

HYPERPONIC GROWING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The present invention pertains to the field of agriculture. The disclosure relates to growing devices and more particularly pertains to a new containment system for cultivating plants in a sealed carbon dioxide enriched atmosphere. The device includes a water and air tight growing chamber which is fluid attached to a supply of carbon dioxide, an air compressor, and an air conditioning unit to safely enable a plant to grow in the sealed system while being exposed to super enriched levels of $CO_2$. The device includes a curved and translucent cooling duct to condense moisture evaporated by the plant inside the system without removing the internal atmosphere or losing access to light, and to cool the containment system. An irrigation unit is in fluid communication with the curved and translucent cooling duct to irrigate the plant with the cool clear ducts internally condensed moisture. The device includes a growing light that emits light through the curved and translucent cooling duct to expose the plant to light.

(2) Description of Related Art Including Information Disclosed Under 37 CFR 1.97 and 1.98

The prior art relates to growing devices including a growing chamber which has an adjustable ceiling height, a growing lamp and a supply of carbon dioxide. The prior art discloses a cylindrical growing chamber which has fluorescent lights disposed within the cylindrical growing chamber and an air ventilation unit. The prior art discloses a growing chamber having a translucent outer wall to facilitate a plant within the growing chamber to be exposed to sunlight. The prior art discloses a hydroponic growing unit having an annular enclosure and a light emitter extending vertically in a center of the annular enclosure. The prior art discloses a semi-automated crop device having a module with grids of cells for growing plants and a lighting and airflow fixture above each cell.

(3) Discussion of the State of the Art

In the field of agriculture many systems have been designed for the purpose of increasing plant growth and recycling their resources. None, however, have succeeded in organically eliminating all photosynthetic barriers, fungal infestations, the need for pesticides, or succeed in recycling all of the water evaporated by the plant itself without losing access to light. These issues are due to a number of limiting factors.

Furthermore, academic work in agronomy has reported many plant species are substantially aided by super-enriched levels of $CO_2$ (10,000-100,000 parts per million). Safely eliminating this and the other remaining barriers presents a number of challenges.

These challenges are further compounded by the fact that in order for plants to effectively absorb highly-enriched levels of $CO_2$ the organism must also be exposed to a powerful light source. Since $CO_2$ is a greenhouse gas, an air and water tight $CO_2$ enriched containment system will inevitably trap heat when sealed and exposed to the intense light. As a result, the temperature would quickly rise inside the system to a level that would extinguish the life of any organism growing within it.

Moreover, research studies have suggested that plants can evaporate up to 99.9% of the water drawn up by their roots through a process called evapotranspiration. Additionally world reports currently state that 70% of global fresh water usage is used entirely on agriculture and up to 95% in developing countries.

Finally, in our normal global habitat, plants are continuously subjected to random weather patterns and attacks from other organisms. These problems are then magnified by growing insect pesticide resistance, fungi, soil erosion, fresh water deficits, climate change, pollutants, viral outbreaks, and inadequate access to light and nutrients.

Therefore, what is clearly needed is a system designed to organically mitigate each of these problems while simultaneously allowing a plant to grow at its maximum efficiency instead of being limited by one or more of its resources and or environment.

BRIEF SUMMARY OF THE INVENTION

An embodiment of the disclosure meets the needs presented above by generally comprising a growing chamber for supporting the growth of a plant positioned within the growing chamber. A cooling duct is attached to the growing chamber and the cooling duct is comprised of a translucent material to pass light through the cooling duct. The cooling duct is fluidly coupled to an air conditioning unit to facilitate moisture within the growing chamber to condense on the cooling duct. A growing light is suspended from the growing chamber to emit light through the cooling duct to facilitate the plant to be exposed to the light emitted by the growing light. An irrigation unit is in fluid communication internally with the cooling duct to collect the condensed moisture from the cooling duct. Furthermore, the irrigation unit has an outlet integrated into a pot in which the plant is growing to direct the condensed moisture into the pot for irrigating the plants growing inside.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Enabling plant growth in atmospheric containment has the auxiliary benefit of trapping the water evaporated by the plant inside the vessel. Using a process called evapotranspiration condensation irrigation (E.C.I.), this system is designed to cool the translucent ceiling duct of the chamber located between the light and the vessel. The first purpose of E.C.I. is to condense the evaporated water inside the system and immediately deliver the water back to the plant. Its secondary purpose is to mitigate the temperature rise due to elevated greenhouse gasses and atmospheric containment inside the system without disrupting the chamber's internal atmosphere concentrations.

Our planet achieves this globally through cloud formation and rainfall, but this containment system accomplishes the same function without losing access to light. Furthermore, by shining the light through the system, the water that is continuously coalescing and falling inside the chamber turns the light coming from above into an incalculable amount of constantly changing refraction points. This further benefits plant growth by multiplying the light's photonic wave function into numerously more points of refraction than the light above could achieve on its own.

This process is achieved by enclosing and insulating the area above the sealed chamber where the light is suspended directly over a translucent cool air duct. Two vents are connected to this enclosed area. One is a cool air intake vent attached to an air conditioning system connected via duct work, and the other vent is an exhaust. This allows the controller to pump cold air through the clear air duct and in turn cool the ceiling of the chamber.

The E.C.I. process enabled by the translucent duct causes the water evaporated by the plant to condense on the ceiling inside the sealed chamber where the water is then delivered directly back to the plant, thereby eliminating the 99% loss of water that normally occurs through evapotranspiration. As a byproduct, the lifespan, efficiency, and output of the light above the system is substantially increased due to cooler operating temperatures.

The chamber system is designed to achieve all this while simultaneously cooling the chamber itself, thereby creating an ideal internal temperature and humidity level for plant growth. This allows the plant access to super-enriched levels of $CO_2$ without the plant losing access to a high intensity light source or harming the operator.

An ancillary benefit of super-enriched levels of $CO_2$ maintained in the atmosphere inside the system is that any oxygen breathing lifeform as well as fungi are asphyxiated. Thereby organically eliminating the need for pesticides herbicides and fungicides.

Figure 1:
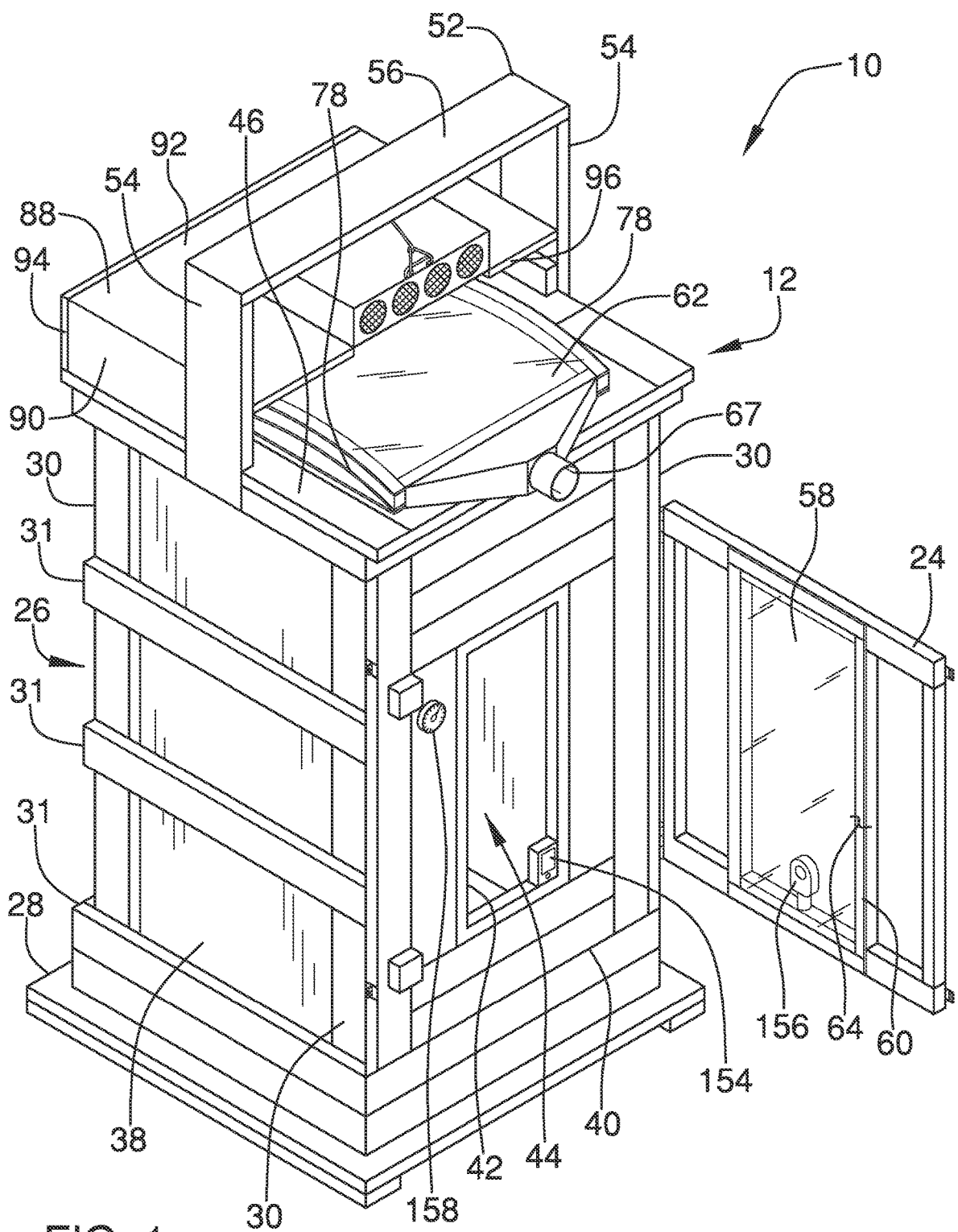
FIG. 1 is a front perspective view of a hyperponic growing apparatus according to an embodiment of the disclosure.
Figure 2:
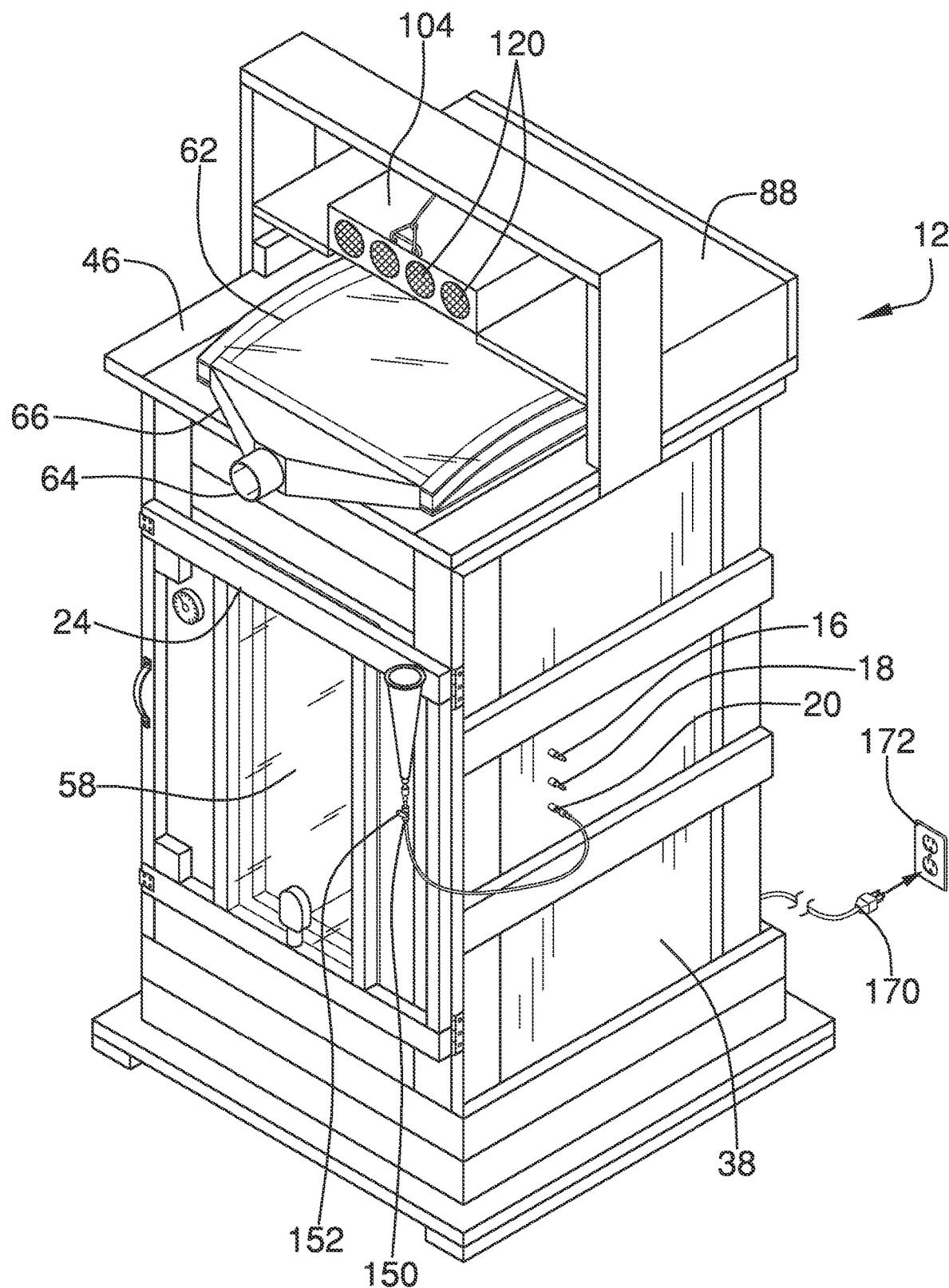
FIG. 2 is a left side perspective view of an embodiment of the disclosure.
Figure 3:
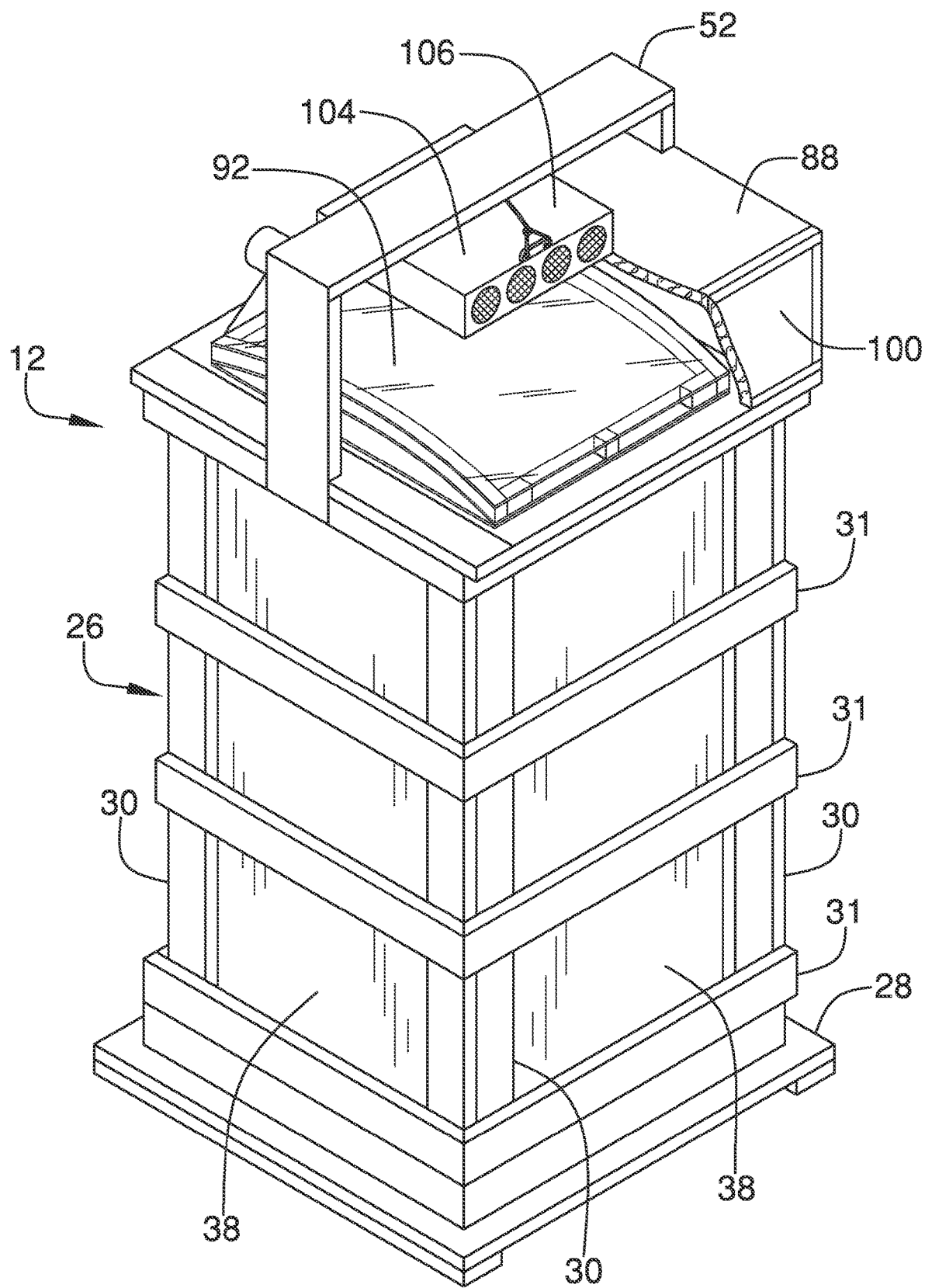
FIG. 3 is a back perspective view of an embodiment of the disclosure.
Figure 4:
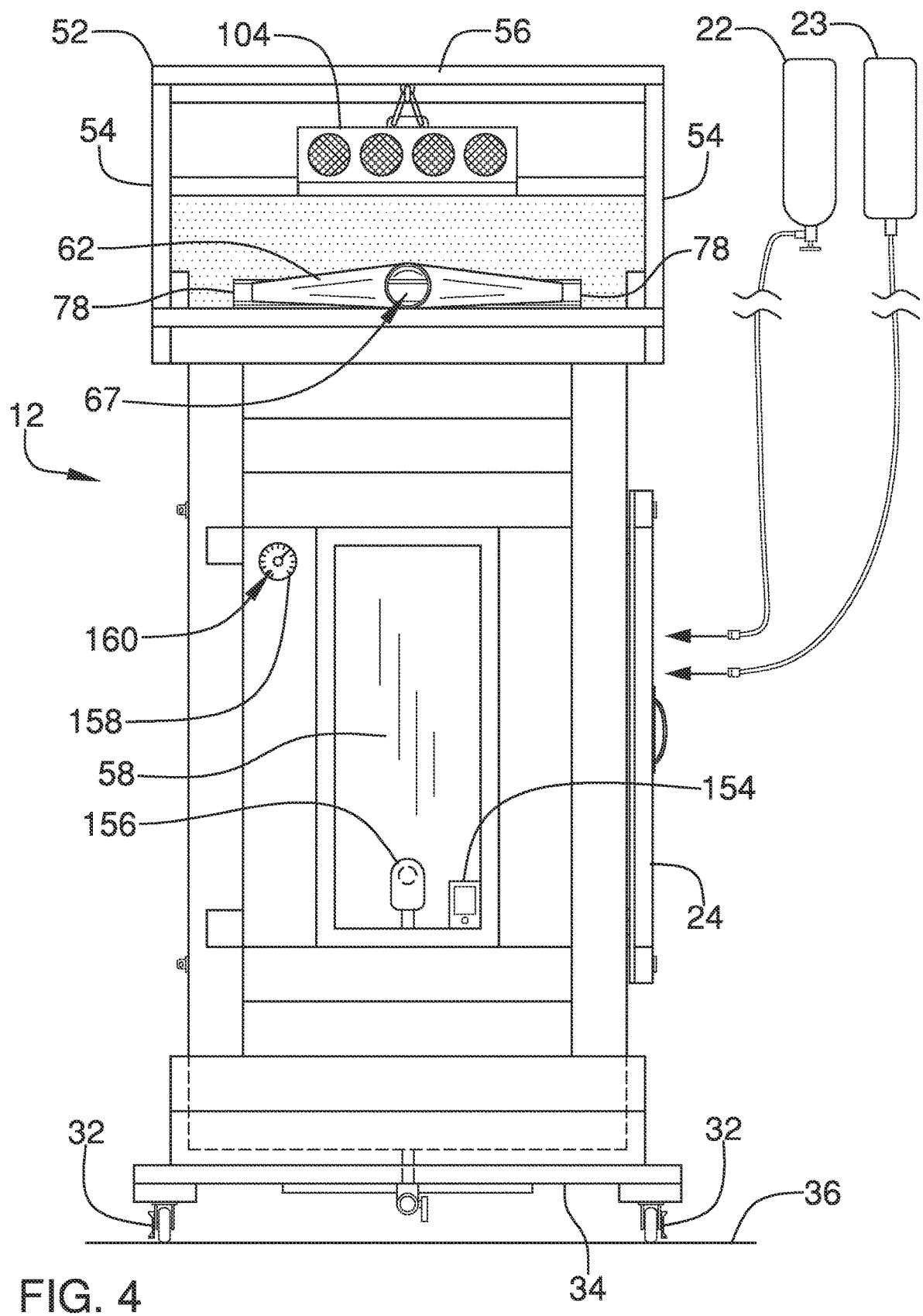
FIG. 4 is a front view of an embodiment of the disclosure.
Figure 5:
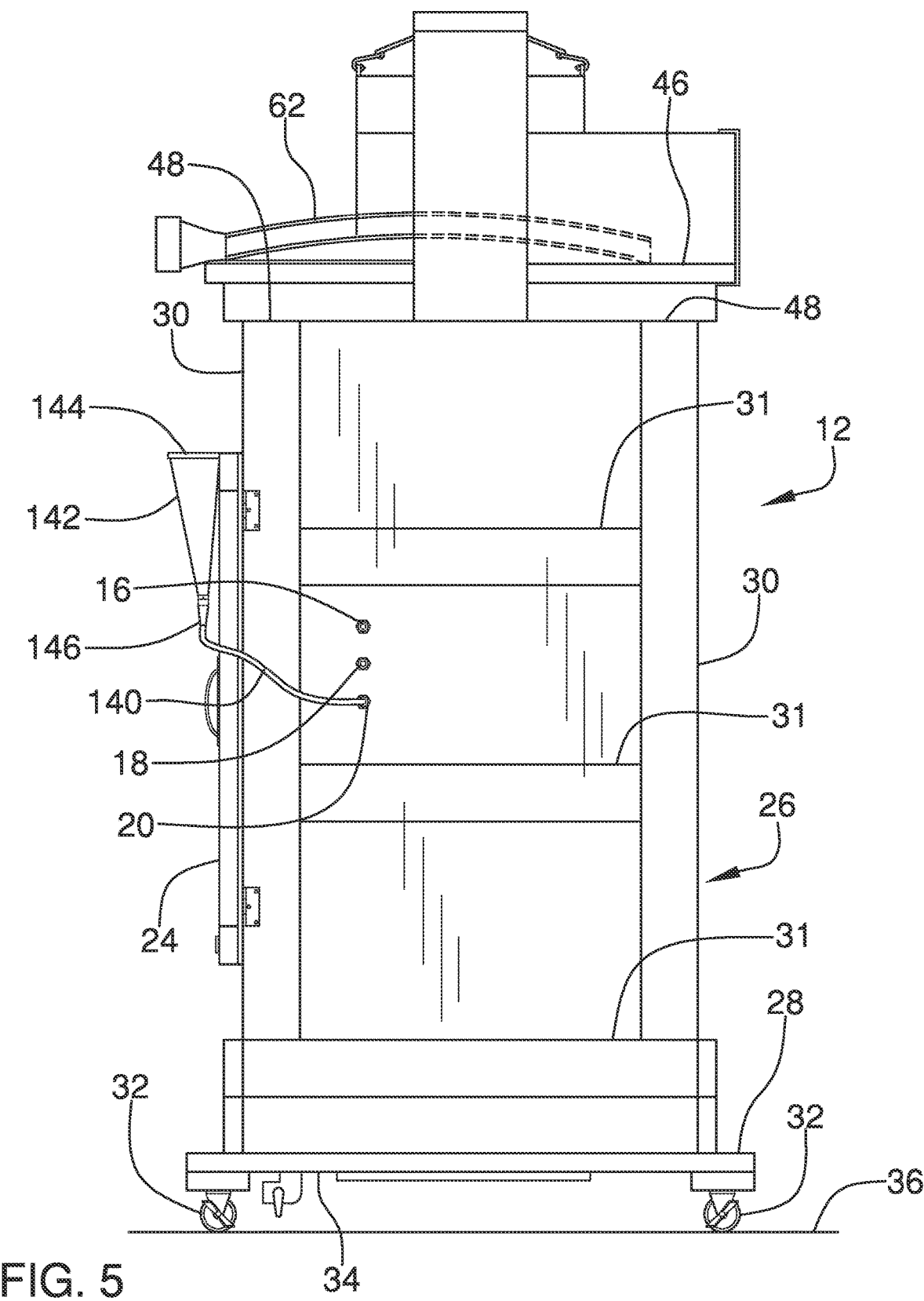
FIG. 5 is a left side view of an embodiment of the disclosure.
Figure 6:
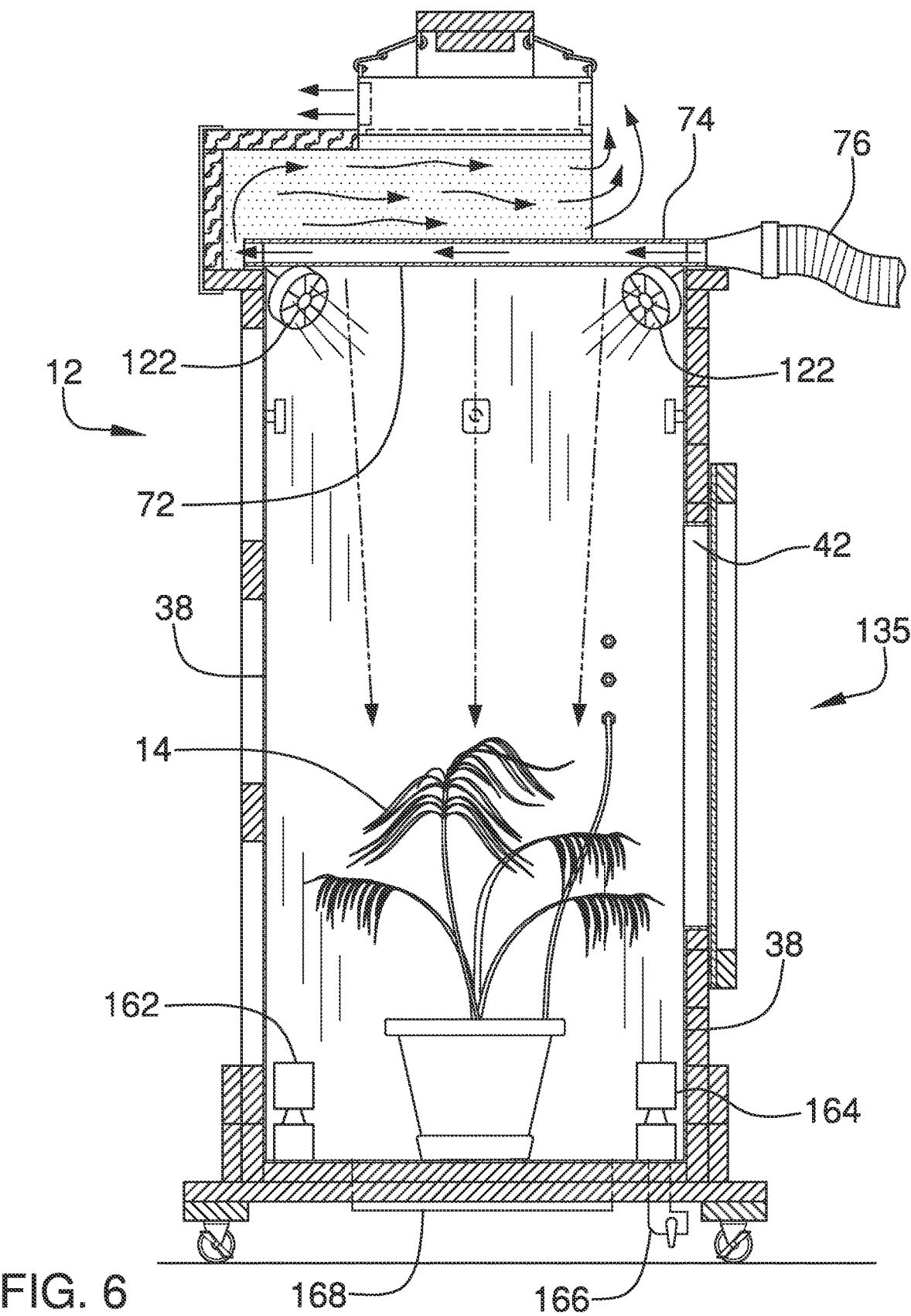
FIG. 6 is a left side cut-away view of an alternative embodiment of the disclosure.
Figure 7:
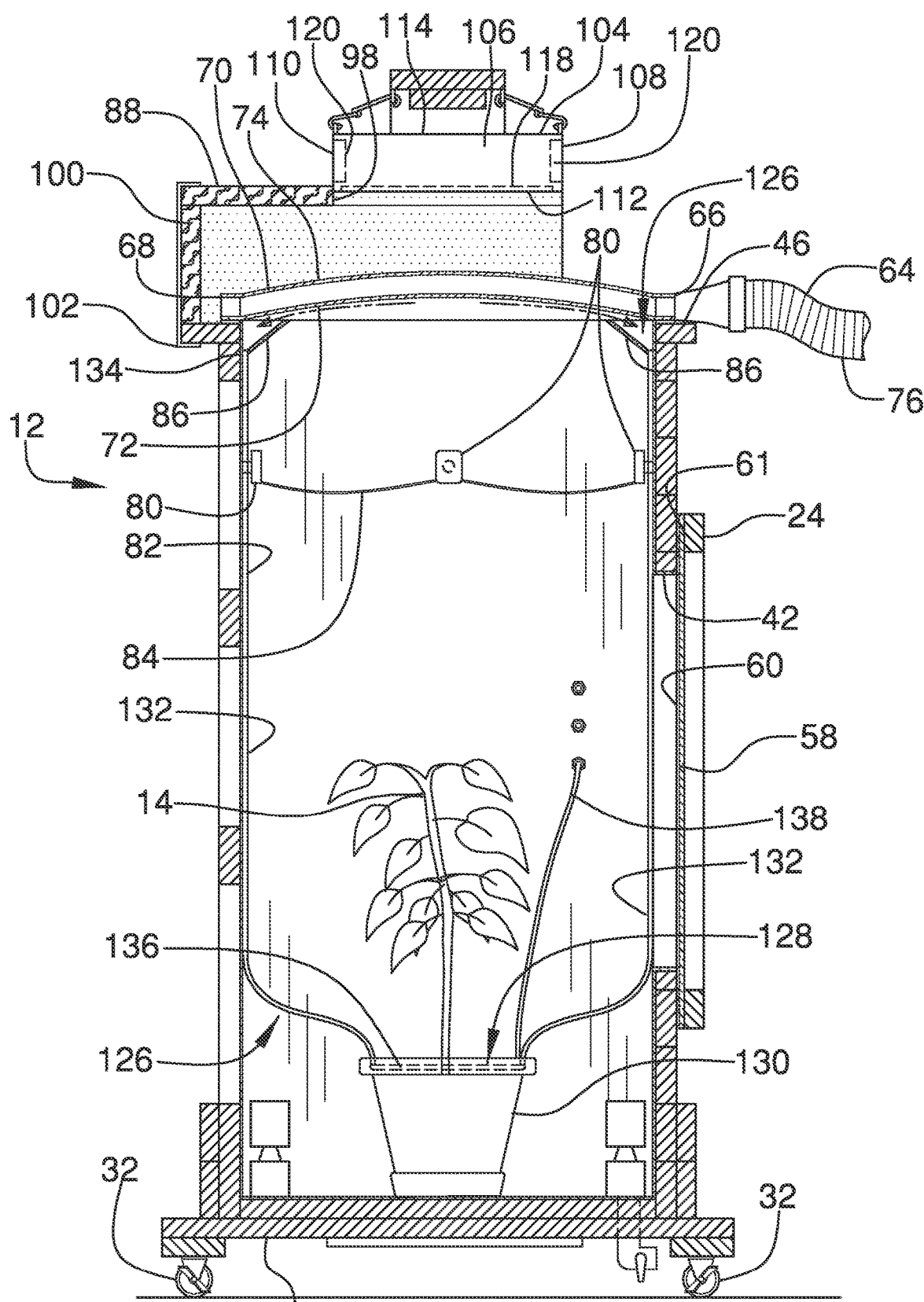
FIG. 7 is a left side cut-away view of an embodiment of the disclosure.

With reference now to the drawings, and in particular to FIGS. 1 through 7 thereof, a new growing device embodying the principles and concepts of an embodiment of the disclosure and generally designated by the reference numeral 10 will be described.

As best illustrated in FIGS. 1 through 7, the hyperponic growing apparatus 10 generally comprises a growing chamber 12 that is comprised of a fluid impermeable material thereby facilitating an interior of the growing chamber 12 to be atmospherically controlled for supporting the growth of a plant 14 positioned within the growing chamber 12. The plant 14 may be any plant that would commonly be conscientiously grown indoors or outdoors. The growing chamber 12 has an inlet port 16, an exhaust port 18 and an irrigation port 20 that is each in fluid communication with the interior of the growing chamber 12. The inlet port 16 is fluidly attachable to a supply of carbon dioxide 22 to facilitate the interior of the growing chamber 12 to comprise an atmosphere of enriched carbon dioxide. In this way the growing chamber 12 can enhance growth of the plant 14 while inhibiting insects and fungi from surviving within the growing chamber 12. The supply of carbon dioxide 22 might be a vessel containing pressurized gaseous carbon dioxide or the like. The exhaust port 18 is fluidly attachable to an exhaust vent 23 thereby facilitating the interior of the growing chamber 12 to be selectively ventilated.

The growing chamber 12 includes a door 24 that is hingedly attached to the growing chamber 12 for opening and closing the growing chamber 12. The growing chamber 12 comprises a frame 26 that has a base 28, a plurality of vertical members 30 each extending upwardly from the base 28 and a plurality of horizontal members 31 each extending around the plurality of vertical members 30. Furthermore, each of the vertical members 30 is oriented to define a respective one of four corners of a cubic shape. A plurality of rollers 32 is each rotatably coupled to a bottom surface 34 of the base 28 thereby facilitating the plurality of rollers 32 to roll along a support surface 36 for moving the frame 26 on the support surface 36. Additionally, each of the rollers 32 is aligned with a respective one of four corners of the base 28 and each of the rollers 32 may comprise locking casters, wheels or any other appropriate type of roller.

The growing chamber 12 includes a plurality of wall panels 38 that each extends between a respective pair of the vertical members 30 such that each of the wall panels 38 defines a respective one of a plurality of sides of the cubic shape. Each of the wall panels 38 extends along a full height of the respective pair of the vertical members 30. Furthermore, each of the inlet port 16, the exhaust port 18 and the irrigation port 20 extends through a respective one of the wall panels 38. The plurality of wall panels 38 includes a front wall panel 40 and the front wall panel 40 has an opening 42 extending through the front wall panel 40 to define an entry 44 into the growing chamber 12. The growing chamber 12 includes a ceiling panel 46 that is mounted to a top end 48 of each of the vertical members 30 and the ceiling panel 46 has an opening 50 extending through the ceiling panel 46. The growing chamber 12 includes a light support 52 which comprises a pair of outward members 54 each being coupled to and extending upwardly from the ceiling panel 46 and a middle member 56 extending between each of the outward members 54 such that the middle member 56 is spaced upwardly from the ceiling panel 46.

The door 24 has a window 58 that is integrated into the door 24 and the door 24 has a seal 60 that is bonded to a rear surface 61 of the door 24. The seal 60 extends around a full perimeter of the window 58 and the window 58 is aligned with the entry 44 when the door 24 is closed. Additionally, the window 58 is comprised of a translucent material thereby facilitating the interior of the growing chamber 12 to be visible when the door 24 is closed. The seal 60 is compressed against the front wall panel 40 when the door 24 is closed thereby forming a fluid impermeable seal 60 between the door 24 and the front wall panel 40 when the door 24 is closed.

A cooling duct 62 is attached to the growing chamber 12 and the cooling duct 62 is comprised of a translucent material to pass light through the cooling duct 62. The cooling duct 62 is fluidly coupled to an air conditioning unit 64 thereby facilitating the cooling duct 62 to receive cooled air from the air conditioning unit 64. In this way the cooling duct 62 facilitates moisture within the growing chamber 12 to condense on the cooling duct 62. The cooling duct 62 has a front end 66, a rear end 68 and an outer wall 70 extending between the front end 66 and the rear end 68 and the outer wall 70 has a lower side 72 and an upper side 74. The front end 66 tapering to an inlet port 67 that is in fluid communication with an interior of the cooling duct 62 thereby facilitating the inlet port 16 to be fluidly coupled to a supply hose 76 of the air conditioning unit 64. The rear end 68 is open thereby facilitating the cooled air from the air conditioning unit 64 to be exhausted through the rear end 68.

The cooling duct 62 is positioned on the ceiling panel 46 of the growing chamber 12 having the lower side 72 of the outer wall 70 of the cooling duct 62 covering the opening 50 in the ceiling panel 46. In this way the moisture within the growing chamber 12 can condense of the lower side 72 of the outer wall 70. Furthermore, the lower side 72 is concavely arcuate between the front end 66 and the rear end 68 to facilitate the condensed moisture to run toward the front end 66 and the rear end 68 and the upper side 74 is co-arcuate with the lower side 72. The cooling duct 62 includes a pair of sidelong panels 78 each extending between the lower side 72 of the outer wall 70 and the ceiling panel 46 such that each of the sidelong panels 78 and the front end 66 and the rear end 68 surrounds the opening 50 in the ceiling panel 46. Additionally, the cooling duct 62 is positioned between the pair of outward members 54 of the light support 52.

A plurality of supports 80 is provided and each of the supports 80 is attached to an inwardly facing surface 82 of a respective one of the wall panels 38 of the growing chamber 12. In this way a net 84, or other type of planar object, can be suspended from each of the supports 84 having the net 84 lying on a horizontal plane in the growing chamber 12. Additionally, each of the supports 80 is positioned closer to the ceiling panel 46 than the base 28. The growing chamber 12 includes a pair of troughs 86 each angling between the ceiling panel 46 and a respective pair of the vertical members 30 of the frame 26 such that each of the troughs 86 is positioned beneath a respective one of the front end 66 and the rear end 68 of the cooling duct 62. In this way each of the troughs 86 can collect the condensed moisture when the condensed moisture drips from the front end 66 and the rear end 68.

An insulation box 88 is attached to the growing chamber 12 such that the insulation box 88 partially surrounds the cooling duct 62. The insulation box 88 has an outside wall 90 and a top wall 92 and the outside wall 90 extends upwardly from the ceiling panel 46 of the growing chamber 12. The outside wall 90 has a rearmost side 94 and a frontmost side 96 and each of the rearmost side 94 and the frontmost side 96 is open. Additionally, the insulation box 88 has a light hole 98 extending through the top wall 92 and the insulation box 88 includes a cover 100 that is insertable into the rearmost side 94 for closing the rearmost side 94.

The insulation box 88 is comprised of a thermally insulating material to limit thermal communication between the cooling duct 62 and ambient air. Furthermore, the rear end 68 of the cooling duct 62 is surrounded by the insulation box 88 such that the cooled air exhausted from the rear end 68 of the cooling duct 62 is routed to exit the frontmost side of the outside wall of the insulation box 88 when the air conditioning unit 64 is turned on. A flap 102 is attached to the frame 26 of the growing chamber 12 and the flap 102 is extendable over the cover 100 of the insulation box 88 when the cover 100 is inserted into the rearmost side 94 of the outside wall 90 of the insulation box 88. Furthermore, the flap 102 is matable to the top wall 92 of the insulation box 88 for retaining the cover 100 in the rearmost side 94.

A growing light 104 is suspended from the growing chamber 12 such that the growing light 104 is positioned over the cooling duct 62 thereby facilitating the growing light 104 to emit light through the cooling duct 62. In this way the growing light 104 facilitates the plant 14 to be exposed to the light emitted by the growing light 104. The growing light 104 comprises a housing 106 that has a forward end 108, a rearward end 110, a lower wall 112 and an upper wall 114. A pair of suspensions 116 is provided and each of the suspensions 116 is attached between the middle member 56 of the light support 52 and the upper wall 114 of the housing 106 for suspending the housing 106 from the middle member 56. Additionally, the lower wall 112 of the housing 106 is aligned with the light hole 98 in the top wall 92 of the insulation box 88. The growing light 104 may be electrically coupled to a timer such that the growing light 104 is automatically turned on and off at optimal times for the growth of the plant 14.

The growing light 104 includes a plurality of light emitters 118 that is each integrated into the lower wall 112 of the housing 106. In this way each of the light emitters 118 emits light through the light hole 98 in the top wall 92 of the insulation box 88 and through the cooling duct 62 and through the opening 50 in the ceiling panel 46. Each of the light emitters 118 may comprise a light emitting diode or other type of electronic light emitter that emits light in a broad electromagnetic spectrum for facilitating the growth of the plant 14. The growing light 104 includes a pair of blowers 120 that is each integrated into a respective one of the forward end 108 and the rearward end 110 of the housing 106. The pair of blowers 120 urges air to pass into the forward end 108 and outward through the rearward end 110 when the pair of blowers 120 is turned on for cooling the plurality of light emitters 118. Furthermore, each of the blowers 120 may comprise an electric fan or other type of electronic blower.

A pair of fans 122 is each mounted to the ceiling panel 46 such that each of the fans 122 is positioned within the growing chamber 12. Each of the fans 122 is positioned on opposite sides of the growing chamber 12 with respect to each other to blow air in a vortex in the growing chamber 12 when the fans 122 are turned on for supporting growth of the plant 14. Each of the fans 122 are hermetically sealed thereby facilitating the fans 122 to operate in a high moisture environment without being damaged. Additionally, each of the fans 122 may comprise an electronic fan that includes a motor and a plurality of blades that are rotated by the motor.

An irrigation unit 124 is provided and the irrigation unit 124 is integrated into the growing chamber 12. The irrigation unit 124 has an inlet 126 that is in fluid communication with the cooling duct 62 to collect the condensed moisture from the cooling duct 62. The irrigation unit 124 has an outlet 128 that is integrated into a pot 130 in which the plant 14 is growing to direct the condensed moisture into the pot 130 for irrigating the plant 14. The irrigation unit 124 comprises a pair of collection tubes 132 that is each of the collection tubes 132 is mounted to a respective one of the wall panels 38 of the growing chamber 12 such that each of the collection tubes 132 is positioned within the growing chamber 12. Additionally, each of the collection tubes 132 has an upper end 134 that is aligned with a respective one of the troughs 86 such that the upper end 134 of each of the collection tubes 132 defines the inlet 126 of the irrigation unit 124. In an alternative embodiment 135 as is most clearly shown in FIG. 6, each of the lower side 72 and the upper side 74 of the cooling duct may lie on a horizontal plane thereby facilitating the condensed moisture to drip from the lower side 72 onto the plant 14.

The irrigation unit 124 includes a foraminous ring 136 that is positioned in the pot 130 containing the plant 14 such that the foraminous ring 136 defines the outlet 128 of the irrigation unit 124. Each of the collection tubes 132 is fluidly attached to the foraminous ring 136 to receive the condensed moisture from the collection tubes 132. In this way the condensed moisture is directed into the foraminous ring 136 to irrigate the plant 14. The irrigation unit 124 includes a first tube 138 that is fluidly coupled between the irrigation port 20 associated with the growing chamber 12 and the foraminous ring 136. The irrigation unit 124 further includes a second tube 140 that is fluidly coupled to the irrigation port 20 such that the second tube 140 is in fluid communication with the first tube 138 has the second tube 140 is positioned outside of the growing chamber 12.

The irrigation unit 124 includes a funnel 142 that is mounted to the growing chamber 12 having the funnel 142 being positioned outside of the growing chamber 12. The funnel 142 tapers between an upper end 144 of the funnel 142 and a lower end 146 of the funnel 142. Additionally, the funnel 142 is vertically oriented on the growing chamber 12 such that a fluid can be poured into the upper end 134 for supplementing irrigation of the plant 14 if the condensation is not sufficient to meet the requirements of the plant 14. The lower end 146 is fluidly coupled to a distal end 148 of the second tube 140 to direct to fluid poured into the funnel 142 into the first tube 138. The irrigation unit 124 includes a valve 150 that is fluidly integrated into the second tube 140.

The valve 150 is positionable in an open condition for facilitating the fluid to pass through the valve 150 and the valve 150 is positionable in a closed condition to inhibit the fluid from passing through the valve 150. The valve 150 includes a knob 152 that is rotatable for moving the valve 150 between the open condition and the closed condition.

An atmospheric monitor 154 is mounted to the growing chamber 12 such that the atmospheric monitor 154 is in fluid communication with the interior of the growing chamber 12. The atmospheric monitor 154 is positioned in the opening 42 in the front wall panel 40 of the growing chamber 12 such that the atmospheric monitor 154 is visible through the window 58 in the door 24 when the door 24 is closed. The atmospheric monitor 154 may comprise an electronic monitor which can measure relative humidity and the atmospheric monitor 154 may include an electronic display which displays the relative humidity atmospheric concentrations and temperature.

A camera 156 is attached to the door 24 such that the camera 156 is directed into the interior of the growing chamber 12 when the door 24 is closed thereby facilitating the camera 156 to capture imagery of the interior of the growing chamber 12 when the door 24 is closed. The camera 156 may comprise a digital camera that captures images over pre-determined durations of time and the camera 156 may have wireless communication capabilities to facilitate images captured by the camera 156 to be remotely viewed on an electronic device.

A temperature sensor 158 is integrated on the exterior of the growing chamber 12 and the temperature sensor 158 is in thermal communication with the exterior of the growing chamber 12. The temperature sensor 158 includes a gauge 160 that is positioned outside of the growing chamber 12 thereby facilitating the gauge 160 to be visible to visually communicate the temperature of the exterior of the growing chamber 12. A humidifier 162 is positioned within the growing chamber 12 thereby facilitating the humidifier 162 to increase the humidity of the interior of the growing chamber 12 thereby facilitates the interior of the growing chamber 12 to be at an optimal humidity for the plant 14. The humidifier 162 may comprise an electronic humidifier of any conventional design.

A dehumidifier 164 is positioned within the growing chamber 12 thereby facilitating the dehumidifier 164 to decrease the humidity of the interior of the growing chamber 12 to facilitate the interior of the growing chamber 12 to be at an optimal humidity for the plant 14. The dehumidifier 164 includes a drain 166 extending through the base 28 of the frame 26 of the growing chamber 12 to facilitate water from the dehumidifier 164 to be drained through the drain 166. The dehumidifier 164 may comprise an electronic dehumidifier of any conventional design.

A heating pad 168 is attached to the base 28 of the frame 26 of the growing chamber 12 and the heating pad 168 is in thermal communication with the base 28 thereby facilitating the heating pad 168 to heat the base 28 when the heating pad 168 is turned on. In this way the heating pad 168 can warm the interior of the growing chamber 12 to facilitate the plant 14 to be maintained at an optimal temperature. The heating pad 168 may comprise an electronic heating pad or the like and the heating pad 168 may have an operational temperature ranging between approximately 60.0 degrees Fahrenheit and 100.0 degrees Fahrenheit.

A power supply 170 is electrically coupled to the heating pad 168 and the dehumidifier 164 and the humidifier 162 and the camera 156 and each of the fans 122 and each of the blowers 120 and each of the light emitters 118. The power supply 170 is electrically coupled to a power source 172 comprising a female electrical outlet. Furthermore, the power supply 170 may include a power cord with a male plug that can be plugged into the female electrical outlet. Additionally, the power supply 170 may include a transformer for lowering the voltage from the female electrical outlet to an appropriate voltage to service each of the various electrical components in the growing chamber 12.

In use, the plant 14 is positioned in the growing chamber 12 and the door 24 is secured in the closed position. The supply of carbon dioxide 22 is fluidly attached to the inlet port 16 thereby facilitating the interior of the growing chamber 12 to be filled with a predetermined amount of the carbon dioxide. In this way the plant 14 can be maintained in an atmosphere of enriched carbon dioxide to facilitate the plant 14 to grow as rapidly as possible. Additionally, the atmosphere of enriched carbon dioxide makes it impossible for insects and fungi to survive in the growing chamber 12 thereby eliminating the need for insecticides herbicides fungicides or pesticides. The moisture within the growing chamber 12 condenses on the cooling duct 62 to be subsequently captured by the troughs 86 and directed into the pot 130 for irrigating the plant 14. Furthermore, the growing light 104 is automatically turned on and off thereby facilitating the plant 14 to be automatically cared for. The exhaust vent 23 is fluidly attached to the exhaust port 18 prior to opening the door 24. In this way the carbon dioxide in the growing chamber 12 can be ventilated prior to opening the door 24 to protect the individual opening the door 24 from potential suffocation or other negative effects of being exposed to the carbon dioxide.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hyperponic growing apparatus for facilitating a plant to be grown in a controlled atmosphere, said system comprising:
   a growing chamber being comprised of a fluid impermeable material thereby facilitating an interior of said growing chamber to be atmospherically controlled for supporting the growth of a plant positioned within said growing chamber, said growing chamber having an inlet port and an exhaust port and an irrigation port each being in fluid communication with said interior of said growing chamber, said inlet port being fluidly attachable to a supply of carbon dioxide to facilitate said interior of said growing chamber to comprise an atmosphere of enriched carbon dioxide wherein said growing chamber is configured to enhance growth of the plant while inhibiting insects and fungi from surviving within said growing chamber, said exhaust port being fluidly attachable to an exhaust vent thereby facilitating said interior of said growing chamber to be selectively ventilated, said growing chamber including a door being hingedly attached to said growing chamber for opening and closing said growing chamber;
   a cooling duct being attached to said growing chamber, said cooling duct being comprised of a translucent material wherein said cooling duct is configured to pass light through said cooling duct, said cooling duct being fluidly coupled to an air conditioning unit thereby facilitating said cooling duct to receive cooled air from the air conditioning unit wherein said cooling duct is configured to facilitate moisture within said growing chamber to condense on said cooling duct;
   an insulation box being attached to said growing chamber such that said insulation box partially surrounds said cooling duct;
   a growing light being suspended from said growing chamber such that said growing light is positioned over said cooling duct thereby facilitating said growing light to emit light through said cooling duct wherein said growing light is configured to facilitate the plant to be exposed to the light emitted by said growing light; and
   an irrigation unit being integrated into said growing chamber, said irrigation unit having an inlet being in fluid communication with said cooling duct wherein said inlet is configured to collect the condensed moisture from said cooling duct, said irrigation unit having an outlet being integrated into a pot in which the plant is growing wherein said outlet is configured to direct the condensed moisture into said pot for irrigating the plant.

2. The assembly according to claim 1, wherein said growing chamber comprises:
   a frame having a base, a plurality of vertical members each extending upwardly from said base and a plurality of horizontal members each extending around said plurality of vertical members, each of said vertical members being oriented to define a respective one of four corners of a cubic shape;
   a plurality of rollers, each of said rollers being rotatably coupled to a bottom surface of said base thereby facilitating said plurality of rollers to roll along a support surface for moving said frame on the support surface, each of said rollers being aligned with a respective one of four corners of said base;
   a plurality of wall panels, each of said wall panels extending between a respective pair of said vertical members such that each of said wall panels defines a respective one of a plurality of sides of said cubic shape, each of said wall panels extending along a full height of said respective pair of said vertical members, each of said inlet port and said exhaust port and said irrigation port extending through a respective one of said wall panels, said plurality of wall panels including a front wall panel, said front wall panel having an opening extending through said front wall panel to define an entry into said growing chamber;
   a ceiling panel being mounted to a top end of each of said vertical members, said ceiling panel having an opening extending through said ceiling panel;

a light support comprising a pair of outward members each being coupled to and extending upwardly from said ceiling panel and a middle member extending between each of said outward members such that said middle member is spaced upwardly from said ceiling panel; and said door having a window being integrated into said door, said door having a seal being bonded to a rear surface of said door, said seal extending around a full perimeter of said window, said window being aligned with said entry when said door is closed, said window being comprised of a translucent material thereby facilitating said interior of said growing chamber to be visible when said door is closed, said seal being compressed against said front wall panel when said door is closed thereby forming a fluid impermeable seal between said door and said front wall panel when said door is closed.

3. The apparatus according to claim 2, wherein:

said cooling duct has a front end, a rear end and an outer wall extending between said front end and said rear end, said outer wall having a lower side and an upper side, said front end tapering to an inlet port being in fluid communication with an interior of said cooling duct thereby facilitating said inlet port to be fluidly coupled to a supply hose of the air conditioning unit, said rear end being open thereby facilitating the cooled air from the air conditioning unit to be exhausted through said rear end;

said cooling duct is positioned on said ceiling panel of said growing chamber having said lower side of said outer wall of said cooling duct covering said opening in said ceiling panel wherein said lower side is configured to have the moisture within said growing chamber to condense of said lower side, said lower side being concavely arcuate between said front end and said rear end wherein said lower side is configured to facilitate the condensed moisture to run toward said front end and said rear end, said upper side being co-arcuate with said lower side;

said cooling duct includes a pair of sidelong panels each extending between said lower side of said outer wall and said ceiling panel such that each of said sidelong panels and said front end and said rear end surrounds said opening in said ceiling panel; and said cooling duct is positioned between said pair of outward members of said light support.

4. The apparatus according to claim 3, wherein:

said insulation box has an outside wall and a top wall, said outside wall extending upwardly from said ceiling panel of said growing chamber, said outside wall having a rearmost side and a frontmost side, each of said rearmost side and said frontmost side being open, said insulation box having a light hole extending through said top wall;

said insulation box includes a cover being insertable into said rearmost side for closing said rearmost side;

said insulation box is comprised of a thermally insulating material wherein said insulation box is configured to limit thermal communication between said cooling duct and ambient air; and said rear end of said cooling duct is surrounded by said insulation box such that the cooled air exhausted from said rear end of said cooling duct is routed to exit said frontmost side of said outside wall of said insulation box when the air conditioning unit is turned on.

5. The apparatus according to claim 2, further comprising a plurality of supports, each of said supports being attached to an inwardly facing surface of a respective one of said wall panels of said growing chamber thereby facilitating a net to be suspended from each of said supports having the said net lying on a horizontal plane in said growing chamber, each of said supports being positioned closer to said ceiling panel than said base.

6. The apparatus according to claim 2, wherein said growing chamber includes a pair of troughs each angling between said ceiling panel and a respective pair of said vertical members of said frame such that each of said troughs is positioned beneath a respective one of said front end and said rear end of said cooling duct wherein each of said troughs is configured to collect the condensed moisture when the condensed moisture drips from said front end and said rear end.

7. The apparatus according to claim 6, wherein said irrigation unit comprises:

a pair of collection tubes, each of said collection tubes being mounted to a respective one of said wall panels of said growing chamber such that each of said collection tubes is positioned within said growing chamber, each of said collection tubes having an upper end being aligned with a respective one of said troughs such that said upper end of each of said collection tubes defines said inlet; and a foraminous ring being positioned in said pot containing the plant, each of said collection tubes being fluidly attached to said foraminous ring wherein said foraminous ring is configured to receive the condensed moisture from said collection tubes for directing the condensed moisture into said foraminous ring to irrigate the plant.

8. The apparatus according to claim 7, wherein said irrigation unit includes:

a first tube being fluidly coupled between said irrigation port associated with said growing chamber and said foraminous ring; and a second tube being fluidly coupled to said irrigation port such that said second tube is in fluid communication with said first tube having said second tube being positioned outside of said growing chamber.

9. The apparatus according to claim 8, wherein said irrigation unit includes:

a funnel being mounted to said growing chamber having said funnel being positioned outside of said growing chamber, said funnel tapering between an upper end of said funnel and a lower end of said funnel, said funnel being vertically oriented on said growing chamber wherein said upper end is configured to have a fluid poured into said upper end, said lower end being fluidly coupled to a distal end of said second tube wherein said second tube is configured to direct to fluid poured into said funnel into said first tube; and a valve being fluidly integrated into said second tube, said valve being positionable in an open condition for facilitating the fluid to pass through said valve, said valve being positionable in a closed condition to inhibit the fluid from passing through said valve, said valve including a knob being rotatable for moving said valve between said open condition and said closed condition.

10. The apparatus according to claim 2, wherein said growing light comprises:

a housing having a forward end, a rearward end, a lower wall and an upper wall;

a pair of suspensions, each of said suspensions being attached between said middle member of said light support and said upper wall of said housing for suspending said housing from said middle member, said lower wall of said housing being aligned with said light hole in said top wall of said insulation box;

a plurality of light emitters, each of said light emitters being integrated into said lower wall of said housing wherein each of said light emitters is configured to emit light through said light hole in said top wall of said insulation box and through said cooling duct and through said light hole in said ceiling panel; and a pair of blowers, each of said blowers being integrated into a respective one of said forward end and said rearward end of said housing, said pair of blowers urging air to pass into said forward end and outward through said rearward end when said pair of blowers is turned on for cooling said plurality of light emitters.

11. The apparatus according to claim 2, further comprising a pair of fans, each of said fans being mounted to said ceiling panel such that each of said fans is positioned within said growing chamber, each of said fans being positioned on opposite sides of said growing chamber with respect to each other wherein each of said fans is configured to blow air in vortex in said growing chamber when said fans are turned on for supporting growth of the plant.

12. The apparatus according to claim 2, further comprising an atmospheric monitor being mounted to said growing chamber such that said atmospheric monitor is in fluid communication with said interior of said growing chamber, said atmospheric monitor being positioned in said opening in said front wall panel of said growing chamber such that said atmospheric monitor is visible through said window in said door when said door is closed.

13. The apparatus according to claim 2, further comprising a camera being attached to said door such that said camera is directed into said interior of said growing chamber when said door is closed thereby facilitating said camera to capture imagery of said interior of said growing chamber when said door is closed.

14. The apparatus according to claim 2, further comprising a temperature sensor being integrated into said growing chamber, said temperature sensor being in thermal communication with the exterior of said growing chamber, said temperature sensor including a gauge being positioned outside of said growing chamber thereby facilitating said gauge to be visible to visually communicate the temperature of said exterior of said growing chamber.

15. The apparatus according to claim 2, further comprising:

a humidifier being positioned within said growing chamber thereby facilitating said humidifier to increase the humidity of said interior of said growing chamber wherein said humidifier is configured to facilitate said interior of said growing chamber to be at an optimal humidity for the plant; and a dehumidifier being positioned within said growing chamber thereby facilitating said dehumidifier to decrease the humidity of said interior of said growing chamber wherein said dehumidifier is configured to facilitate said interior of said growing chamber to be at an optimal humidity for the plant, said dehumidifier including a drain extending through said base of said frame of said growing chamber wherein said drain is configured to facilitate water from said dehumidifier to be drained through said drain.

16. The apparatus according to claim 2, further comprising a heating pad being attached to said base of said frame of said growing chamber, said heating pad being in thermal communication with said base thereby facilitating said heating pad to heat said base when said heating pad is turned on thereby warming said interior of said growing chamber wherein said heating pad is configured to facilitate the plant to be maintained at an optimal temperature.

17. The apparatus according to claim 1, further comprising:

a heating pad being disposed in said growing chamber;

a humidifier being disposed in said growing chamber;

a dehumidifier being disposed in said growing chamber;

a camera being disposed in said growing chamber;

a pair of fans each being disposed in said growing chamber;

a pair of blowers each being disposed in said growing chamber;

a plurality of light emitters each being disposed in said growing chamber; and a power supply being electrically coupled to said heating pad and said dehumidifier and said humidifier and said camera and each of said fans and each of said blowers and each of said light emitters, said power supply being electrically coupled to a power source comprising a female electrical outlet.

18. A hyperponic growing apparatus for facilitating a plant to be grown in a controlled atmosphere, said assembly comprising:

a growing chamber being comprised of a fluid impermeable material thereby facilitating an interior of said growing chamber to be atmospherically controlled for supporting the growth of a plant positioned within said growing chamber, said growing chamber having an inlet port and an exhaust port and an irrigation port each being in fluid communication with said interior of said growing chamber, said inlet port being fluidly attachable to a supply of carbon dioxide to facilitate said interior of said growing chamber to comprise an atmosphere of enriched carbon dioxide wherein said growing chamber is configured to enhance growth of the plant while inhibiting insects and fungi from surviving within said growing chamber, said exhaust port being fluidly attachable to an exhaust vent thereby facilitating said interior of said growing chamber to be selectively ventilated, said growing chamber including a door being hingedly attached to said growing chamber for opening and closing said growing chamber, said growing chamber comprising:

a frame having a base, a plurality of vertical members each extending upwardly from said base and a plurality of horizontal members each extending around said plurality of vertical members, each of said vertical members being oriented to define a respective one of four corners of a cubic shape;

a plurality of rollers, each of said rollers being rotatably coupled to a bottom surface of said base thereby facilitating said plurality of rollers to roll along a support surface for moving said frame on the support surface, each of said rollers being aligned with a respective one of four corners of said base;

a plurality of wall panels, each of said wall panels extending between a respective pair of said vertical members such that each of said wall panels defines a respective one of a plurality of sides of said cubic shape, each of said wall panels extending along a full height of said respective pair of said vertical members, each of said inlet port and said exhaust port and said irrigation port extending through a respective one of said wall panels, said plurality of wall panels including a front wall panel, said front wall panel having an opening extending through said front wall panel to define an entry into said growing chamber;

a ceiling panel being mounted to a top end of each of said vertical members, said ceiling panel having an opening extending through said ceiling panel;

a light support comprising a pair of outward members each being coupled to and extending upwardly from said ceiling panel and a middle member extending between each of said outward members such that said middle member is spaced upwardly from said ceiling panel; and said door having a window being integrated into said door, said door having a seal being bonded to a rear surface of said door, said seal extending around a full perimeter of said window, said window being aligned with said entry when said door is closed, said window being comprised of a translucent material thereby facilitating said interior of said growing chamber to be visible when said door is closed, said seal being compressed against said front wall panel when said door is closed thereby forming a fluid impermeable seal between said door and said front wall panel when said door is closed, and a curtain to cover said window, said curtain being retractable such that said curtain is configured to selectively permit viewing the plants through said window;

a cooling duct being attached to said growing chamber, said cooling duct being comprised of a translucent material wherein said cooling duct is configured to pass light through said cooling duct, said cooling duct being fluidly coupled to an air conditioning unit thereby facilitating said cooling duct to receive cooled air from the air conditioning unit wherein said cooling duct is configured to facilitate moisture within said growing chamber to condense on said cooling duct, said cooling duct having a front end, a rear end and an outer wall extending between said front end and said rear end, said outer wall having a lower side and an upper side, said front end tapering to an inlet port being in fluid communication with an interior of said cooling duct thereby facilitating said inlet port to be fluidly coupled to a supply hose of the air conditioning unit, said rear end being open thereby facilitating the cooled air from the air conditioning unit to be exhausted through said rear end, said cooling duct being positioned on said ceiling panel of said growing chamber having said lower side of said outer wall of said cooling duct covering said opening in said ceiling panel wherein said lower side is configured to have the moisture within said growing chamber to condense of said lower side, said lower side being concavely arcuate between said front end and said rear end wherein said lower side is configured to facilitate the condensed moisture to run toward said front end and said rear end, said upper side being co-arcuate with said lower side, said cooling duct including a pair of sidelong panels each extending between said lower side of said outer wall and said ceiling panel such that each of said sidelong panels and said front end and said rear end surrounds said opening in said ceiling panel, said cooling duct being positioned between said pair of outward members of said light support;

a plurality of supports, each of said supports being attached to an inwardly facing surface of a respective one of said wall panels of said growing chamber thereby facilitating a net to be suspended from each of said supports having the said net lying on a horizontal plane in said growing chamber, each of said supports being positioned closer to said ceiling panel than said base;

wherein said growing chamber includes a pair of troughs each angling between said ceiling panel and a respective pair of said vertical members of said frame such that each of said troughs is positioned beneath a respective one of said front end and said rear end of said cooling duct wherein each of said troughs is configured to collect the condensed moisture when the condensed moisture drips from said front end and said rear end;

an insulation box being attached to said growing chamber such that said insulation box partially surrounds said cooling duct, said insulation box having an outside wall and a top wall, said outside wall extending upwardly from said ceiling panel of said growing chamber, said outside wall having a rearmost side and a frontmost side, each of said rearmost side and said frontmost side being open, said insulation box having a light hole extending through said top wall, said insulation box including a cover being insertable into said rearmost side for closing said rearmost side, said insulation box being comprised of a thermally insulating material wherein said insulation box is configured to limit thermal communication between said cooling duct and ambient air, said rear end of said cooling duct being surrounded by said insulation box such that the cooled air exhausted from said rear end of said cooling duct is routed to exit said frontmost side of said outside wall of said insulation box when the air conditioning unit is turned on;

a flap being attached to said frame of said growing chamber, said flap being extendable over said cover of said insulation box when said cover is inserted into said rearmost side of said outside wall of said insulation box, said flap being matable to said top wall of said insulation box for retaining said cover in said rearmost side;

a growing light being suspended from said growing chamber such that said growing light is positioned over said cooling duct thereby facilitating said growing light to emit light through said cooling duct wherein said growing light is configured to facilitate the plant to be exposed to the light emitted by said growing light, said growing light comprising:

a housing having a forward end, a rearward end, a lower wall and an upper wall;

a pair of suspensions, each of said suspensions being attached between said middle member of said light support and said upper wall of said housing for suspending said housing from said middle member, said lower wall of said housing being aligned with said light hole in said top wall of said insulation box;

a plurality of light emitters, each of said light emitters being integrated into said lower wall of said housing wherein each of said light emitters is configured to emit light through said light hole in said top wall of said insulation box and through said cooling duct and through said light hole in said ceiling panel; and a pair of blowers, each of said blowers being integrated into a respective one of said forward end and said rearward end of said housing, said pair of blowers urging air to pass into said forward end and outward through said rearward end when said pair of blowers is turned on for cooling said plurality of light emitters;

a pair of fans, each of said fans being mounted to said ceiling panel such that each of said fans is positioned within said growing chamber, each of said fans being positioned on opposite sides of said growing chamber with respect to each other wherein each of said fans is configured to blow air in vortex in said growing chamber when said fans are turned on for supporting growth of the plant;

an irrigation unit being integrated into said growing chamber, said irrigation unit having an inlet being in fluid communication with said cooling duct wherein said inlet is configured to collect the condensed moisture from said cooling duct, said irrigation unit having an outlet being integrated into a pot in which the plant is growing wherein said outlet is configured to direct the condensed moisture into said pot for irrigating the plant, said irrigation unit comprising:

a pair of collection tubes, each of said collection tubes being mounted to a respective one of said wall panels of said growing chamber such that each of said collection tubes is positioned within said growing chamber, each of said collection tubes having an upper end being aligned with a respective one of said troughs such that said upper end of each of said collection tubes defines said inlet;

a foraminous ring being positioned in said pot containing the plant, each of said collection tubes being fluidly attached to said foraminous ring wherein said foraminous ring is configured to receive the condensed moisture from said collection tubes for directing the condensed moisture into said foraminous ring to irrigate the plant;

a first tube being fluidly coupled between said irrigation port associated with said growing chamber and said foraminous ring;

a second tube being fluidly coupled to said irrigation port such that said second tube is in fluid communication with said first tube having said second tube being positioned outside of said growing chamber;

a funnel being mounted to said growing chamber having said funnel being positioned outside of said growing chamber, said funnel tapering between an upper end of said funnel and a lower end of said funnel, said funnel being vertically oriented on said growing chamber wherein said upper end is configured to have a fluid poured into said upper end, said lower end being fluidly coupled to a distal end of said second tube wherein said second tube is configured to direct to fluid poured into said funnel into said first tube; and a valve being fluidly integrated into said second tube, said valve being positionable in an open condition for facilitating the fluid to pass through said valve, said valve being positionable in a closed condition to inhibit the fluid from passing through said valve, said valve including a knob being rotatable for moving said valve between said open condition and said closed condition;

an atmospheric monitor being mounted to said growing chamber such that said atmospheric monitor is in fluid communication with said interior of said growing chamber, said atmospheric monitor being positioned in said opening in said front wall panel of said growing chamber such that said atmospheric monitor is visible through said window in said door when said door is closed;

a camera being attached to said door such that said camera is directed into said interior of said growing chamber when said door is closed thereby facilitating said camera to capture imagery of said interior of said growing chamber when said door is closed;

a temperature sensor being integrated into said growing chamber, said temperature sensor being in thermal communication with said the exterior of said growing chamber, said temperature sensor including a gauge being positioned outside of said growing chamber thereby facilitating said gauge to be visible to visually communicate the temperature of said exterior of said growing chamber;

a humidifier being positioned within said growing chamber thereby facilitating said humidifier to increase the humidity of said interior of said growing chamber wherein said humidifier is configured to facilitate said interior of said growing chamber to be at an optimal humidity for the plant;

a dehumidifier being positioned within said growing chamber thereby facilitating said dehumidifier to decrease the humidity of said interior of said growing chamber wherein said dehumidifier is configured to facilitate said interior of said growing chamber to be at an optimal humidity for the plant, said dehumidifier including a drain extending through said base of said frame of said growing chamber wherein said drain is configured to facilitate water from said dehumidifier to be drained through said drain;

a heating pad being attached to said base of said frame of said growing chamber, said heating pad being in thermal communication with said base thereby facilitating said heating pad to heat said base when said heating pad is turned on thereby warming said interior of said growing chamber wherein said heating pad is configured to facilitate the plant to be maintained at an optimal temperature; and a power supply being electrically coupled to said heating pad and said dehumidifier and said humidifier and said camera and each of said fans and each of said blowers and each of said light emitters, said power supply being electrically coupled to a power source comprising a female electrical outlet.

\* \* \* \* \*